(12) United States Patent
May et al.

(10) Patent No.: US 10,735,288 B2
(45) Date of Patent: Aug. 4, 2020

(54) COMPONENT FOR A MACHINE OR INDUSTRIAL PLANT AND METHOD FOR CONTROLLING A COMPONENT IN A MACHINE OR INDUSTRIAL PLANT

(71) Applicant: Robert Bosch GmbH, Stuttgart (DE)

(72) Inventors: Gunther May, Karlstadt (DE); Johannes Von Hoyningen-Huene, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/115,707

(22) Filed: Aug. 29, 2018

(65) Prior Publication Data

US 2019/0068469 A1 Feb. 28, 2019

(30) Foreign Application Priority Data

Aug. 30, 2017 (DE) ........................ 10 2017 215 100

(51) Int. Cl.
| | |
|---|---|
| *H04J 1/16* | (2006.01) |
| *H04L 12/26* | (2006.01) |
| *H04L 29/08* | (2006.01) |
| *H04L 29/14* | (2006.01) |
| *H04L 1/00* | (2006.01) |
| *G05B 19/418* | (2006.01) |
| *H04L 12/24* | (2006.01) |

(52) U.S. Cl.
CPC ...... *H04L 43/0823* (2013.01); *G05B 19/4185* (2013.01); *H04L 1/00* (2013.01); *H04L 1/0009* (2013.01); *H04L 41/06* (2013.01); *H04L 43/0847* (2013.01); *H04L 67/125* (2013.01); *H04L 69/40* (2013.01); *H04L 67/12* (2013.01)

(58) Field of Classification Search
CPC . H04L 43/0823; H04L 43/0847; H04L 11/00; H04L 41/06; H04L 41/0654; H04L 69/40
See application file for complete search history.

(56) References Cited

U.S. PATENT DOCUMENTS

2019/0123860 A1* 4/2019 Xu ........................... H04L 1/00

\* cited by examiner

*Primary Examiner* — Bo Hui A Zhu
(74) *Attorney, Agent, or Firm* — Maginot, Moore & Beck LLP

(57) ABSTRACT

A component is disclosed having a network communication device that controls transmission of data in a data network between the component and another component, without a repeat transmission of time-critical data of the plurality of data packets being possible in a transmission cycle. The network communication device is configured to (i) tolerate a possible packet error in a data packet received in a preceding transmission cycle, (ii) signal to the other component in a following transmission cycle a presence or absence of a packet error, (iii) determine whether the other component has signaled a presence of a packet error in a data packet sent by the component in the preceding transmission cycle, and (iv) depending on whether the other component signaled the presence of a packet error, adjust a number of redundancy data items in a data packet to be sent in the following transmission cycle.

9 Claims, 4 Drawing Sheets

COMPONENT FOR A MACHINE OR INDUSTRIAL PLANT AND METHOD FOR CONTROLLING A COMPONENT IN A MACHINE OR INDUSTRIAL PLANT

This application claims priority under 35 U.S.C. § 119 to application no. DE 10 2017 215 100.5, filed on Aug. 30, 2017 in Germany, the disclosure of which is incorporated herein by reference in its entirety.

TECHNICAL FIELD

The present disclosure relates to a component for a machine or industrial plant and a method for controlling a component in a machine or industrial plant, in both of which in the case of a data transfer between the components of the industrial plant without data packet repetition successive data packet errors are avoided, so that a secure, real-time-enabled data transfer is possible.

BACKGROUND

In an industrial plant, control devices are used for example for controlling transport systems, for controlling tools, such as welding tools, screwing and/or drilling tools, riveting tools, etc., for controlling sensors, controlling actuators, such as linear motors and rotary machines, etc. Normally, actions or tasks and thus the control of a component of the industrial plant to be controlled, such as a tool, are dependent on actions or results of another component of the industrial plant. Therefore, there is often a requirement that a data transmission takes place in real time between the control device and the components of the industrial plant to be controlled. In accordance with the DIN 44300 standard (Information Processing), part 9 (Processing sequences) now superseded by DIN ISO/IEC 2382, the real-time operation of a computing system is understood to mean one in which programs for processing incoming data are constantly operationally ready, such that the processing results are available within a specified time interval. Depending on the specific application case the data can accrue according to a temporally random distribution or at predetermined times.

In real-time capable networks, the transmission of time-critical data packets must be guaranteed within a specific time frame. In many real-time systems, this time window is defined by communication cycles, in which data are exchanged periodically or cyclically.

The reception of data packets must generally not be delayed beyond this time window. In the real-time capable networks it is therefore ensured that valid control data and status information are available at specific times and can be further processed.

In industrial automation as an example of real-time capable networks, control and status data are continuously exchanged between a central control device and a plurality of sensors or actuators. In this case the important criteria are real-time capability with guaranteed maximum transmission times and a high reliability of the data. As a result, the data transmission procedure must ensure that data are successfully delivered at a particular time.

A serious problem, however, is that in many real-time enabled networks the available transmission capacity is not fully exploited by only one single time-critical service. The rest of the transmission capacity can be used, among other things, for a transmission of additional, non-time-critical data to the same network node and/or a transmission of time-critical and non-time-critical data to other network nodes in the same transmission medium and/or transmission pauses to reduce the energy consumption. The time frame and the allocation of the transmission capacity are usually performed by a central controller.

In the current transmission methods, such as Sercos III, EtherCAT, Profinet, etc., data packet transmission errors cannot be completely eliminated. Depending on the transmission medium, such as unshielded cable or wireless transmission, and possibly shortened data transmission cycle times, one or more packet errors can occur in succession. This cannot be handled with the currently available error correction techniques, so that in the worst case the packet errors can lead to the failure of at least one component of the industrial plant or even the entire industrial plant. As a result, costly downtimes of the industrial plant are incurred.

SUMMARY

The object of the present disclosure is to provide a component for a machine or industrial plant and a method for controlling a component in a machine or industrial plant, with which the above problems can be solved. In particular, a component for a machine or industrial plant and a method for controlling a component in a machine or industrial plant will be provided, with which failures of components of the industrial plant can be minimized.

This object is achieved by a component for a machine or industrial plant according to the disclosure. The controller comprises a network communication device for controlling a transmission of data in a data network of the machine or industrial plant, in which data packets with a predetermined packet length are transmitted cyclically between the component and at least one other component of the machine or the industrial plant without a repeat transmission of time-critical data of the data packet being possible in a transmission cycle, wherein the network communication device is designed to tolerate a possible packet error in a received data packet, which was sent in the preceding transmission cycle, and to signal to the at least one additional component in the following transmission cycle a presence or absence of a packet error, wherein the network communication device is configured to determine whether or not the at least one other component has signaled a packet error for a data packet sent by the component in the previous transmission cycle, wherein the network communication device is designed, depending on the determined result, to adjust the number of redundancy data items in the data packet to be sent in the following transmission cycle, which will increase a correction probability of bit errors in the time-critical data to be sent.

With the component the security of the transmission quality is guaranteed by the fact that although error correction and error detection are applied, not all packet errors can be explicitly avoided, but only critical multiple errors. Using this approach, the following advantages can be achieved at the same time.

With the described component very short data transmission cycle times are possible, since no retransmissions are necessary. In particular, very short data transmission cycle times of this kind are less than or equal to 1 ms.

In addition, with the described component a moderate redundancy averaged over time for error correction is possible, because the redundancy only needs to be increased in the rare cases when packet errors have occurred.

In addition, the component offers a high energy efficiency, since the additional redundancy must only be transmitted and evaluated in rare cases.

In addition, the described component implements an efficient prevention of critical multiple errors, which in certain applications, e.g. in the area of industrial communication in the industrial plant, represent the crucial quality characteristic.

As a result, the component is also applicable in future, real-time enabled networks with short cycle times that use a faulty transmission medium with an increased bit error probability, such as a radio transmission, unshielded cables, etc., and in which a repeated transmission in a cycle is not possible and therefore is not an option for handling packet transmission errors.

Advantageous further embodiments of the component are specified in the disclosure.

The network communications device may be configured, if no packet error is determined in the preceding transmission cycle, to increase the number of time-critical data in the data packet to be transmitted in the following transmission cycle or to include non-time-critical data, which are indeed to be transferred but for which a time delay is non-critical, and wherein the network communication device is designed, if a packet error is determined in the preceding transmission cycle, to include the redundancy data in the data packet to be sent in the following transmission cycle instead of the non-time-critical data or a portion of the time-critical data.

In a specific design the network communication device is also configured to include in the data packet: a first piece of information concerning whether a data packet, which in the preceding cycle was sent to the component by the at least one additional component, had a packet error or not, and a second piece of information concerning the current configuration of the data packet to be sent in the current transmission cycle, wherein the second information item can be used by the at least one other component for an error correction of the time-critical data. The first information can be contained in one bit, and the second piece of information can specify the number of check bits in the data packet. Additionally or alternatively, the redundancy data items are check bits.

It is conceivable that the network communication device is additionally designed to examine the time-critical data for bit errors and if at least one bit error is present to perform an error correction of the time-critical data on the basis of the second piece of information and the redundancy data.

In one exemplary embodiment the component also has an application which is designed to use the time-critical data, wherein the network communication device is also designed to transfer the time-critical data to the application if the network communication device has not detected a packet error, and wherein the network communication device is further designed to communicate to the application that transmission errors have occurred and no valid data are available in this transmission cycle if the network communication device has detected a packet error.

In a specific design variant, the component is a control device, which is designed to control at least one tool of the industrial plant as the at least one other component. In accordance with a further specific design variant, the component is a control device of a machine, wherein the control device is designed to control at least one sensor and/or actuator as the at least one other component, or wherein the component is a control device of a vehicle, wherein the control device is designed to control a power-assisted steering or servo-assisted braking system of the vehicle.

At least two of the previously described components can be part of a data network, which also has a cable-bound or wireless transmission medium, wherein the at least two components are connected to each other via the transmission medium, to be able to perform a transmission of data in the data network, in which data packets with a predetermined packet length are transmitted cyclically between one of the components and at least one other component of the machine or industrial plant without a repeat transmission of time-critical data of the data packet being possible in a transmission cycle.

In the data network a control device may be designed to control at least one tool of the industrial plant as the other component and/or designed to control at least one sensor and/or actuator as the additional component, wherein the control device is designed in such a way that the control unit as the central controller can bi-directionally exchange data packets with each additional component, and wherein each additional component is designed in such a way that each of the other components can only exchange data packets with the central controller.

The object is also achieved by a method for controlling at least one component in a machine or industrial plant according to one embodiment. In the case of the at least one component, a network communication device is provided for controlling a transmission of data in a data network of the machine or industrial plant, in which data packets with a predetermined packet length are transmitted cyclically between the component and at least one other component of the machine or the industrial plant without a repeat transmission of time-critical data of the data packet being possible in a transmission cycle. The method comprises the steps: tolerating, with the network communication device, a possible packet error in a received data packet which was sent in the preceding transmission cycle, determining with the network communication device whether or not the at least one other component has signaled a packet error for a data packet transmitted by the component in the preceding transmission cycle, adjusting using the network communication device, depending on the determined result, the number of redundancy data items in the data packet to be sent in the following transmission cycle, which will increase a correction probability of bit errors in the time-critical data to be sent, and including signaling data in the data packet to be sent, which signal to the at least one other component a presence or absence of a packet error in the following transmission cycle.

The method achieves the same benefits as are cited above in relation to the component.

Further possible implementations of the disclosure also comprise combinations of features of the embodiments either described previously or in the following in relation to the exemplary embodiments, which are not explicitly mentioned. A person skilled in the art will also be able to add individual aspects as improvements or additions to each basic form of the present disclosure.

BRIEF DESCRIPTION OF THE DRAWINGS

Exemplary embodiments of the disclosure are presented in the drawings an are explained in more detail in the description below.

In the drawings.

DETAILED DESCRIPTION

Figure 1:
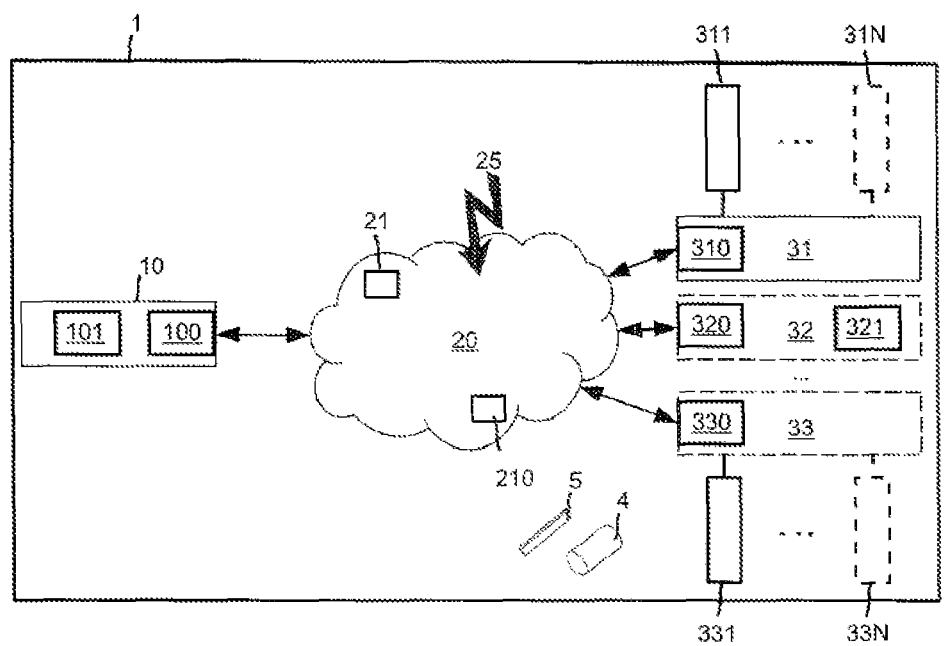
FIG. 1 shows a highly simplified view of an industrial plant, in which components of the industrial plant according to the first exemplary embodiment are connected in a data network for performing data transmission.

In all figures, identical or functionally equivalent elements are labelled with the same reference numeral, unless otherwise indicated.

FIG. 1 shows an industrial plant 1, which can be, for example, a production line for vehicles, furniture, building structures, etc., or a chemical plant etc., in which media or workpieces 4, 5 are transported and/or can be processed with at least one tool, such as with an agitator, a welding tool, a screwdriver and/or drill, a stamping tool, a riveting tool, etc. Alternatively, the industrial plant 1 may also be or have a machine, however, such as a printing machine, a CNC computer (CNC=Computerized Numerical Control), etc., which has at least one controlled actuator and/or drive, for example for a controlled pressure roller, etc. The machine is optionally a vehicle, which has a controller for a power steering system or servo-assisted braking system or for other components of the vehicle. Any number of other examples of a machine and/or industrial plant 1 are conceivable.

In the specific example of FIG. 1, the industrial plant 1 has a control device 10 as a component of the machine or industrial plant 1, a transmission medium 20 and at least one additional component 31, 32, 33. The control device 10 and the at least one additional component 31, 32, 33 of the machine or industrial plant 1 use the transmission medium 20 jointly and form a data network. Both the control device 10 and the at least one other component 31, 32, 33 can each bi-directionally exchange data in the form of data packets 21, 210 via the transmission medium 20 for applications 101, 311 to 31N, 321, 331 to 33N. For this purpose, the control device 10 has a network communication device 100.

The at least one other component 31, 32, 33 has one of the network communication devices 310, 320, 330 in each case, as shown in FIG. 1. In the transmission medium 20 a fault 25 can occur, which can cause errors in the transmission of the data packets 21, 210. In the case of an unshielded cable as a transmission medium 20 or in the case of a radio transmission via the transmission medium 20, such a fault 25 is, for example, an external radiation as a result of electromagnetic radiation, which is emitted in particular by devices, thunder and lightning storms, etc.

The control device 10 as an application 101 has, for example, a microcontroller, a storage device, and software, etc. The software implements, for example, a comparison device that compares actual variables in the operation of the industrial plant 1 with target values. In addition, an evaluation device can be implemented, which on the basis of the output of the comparison device produces new control data, which are to be transferred in the data packets 21, 210 in real time or non-real time over the transmission medium 20 to the at least one additional component 31, 32, 33. The real-time control data are then generally referred to as time-critical data. The non-real-time control data are generally referred to as non-time-critical data.

The first additional component 31 is, for example, a device which as at least one application 311 to 31N has at least one element to be controlled, in particular at least one actuator or drive unit. The at least one actuator or drive unit can drive an axle into a rotary motion or alternatively into a linear motion. In particular, the first additional component 31 can be a robot, a transport device, a rotary machine, a screw tool, an agitator, etc. The control of the first additional component 31 and/or its at least one application 311 to 31N is performed at least partly on the basis of the control data of the control device 10, which the first additional component 31 receives in the data packets 21, 210.

The second additional component 32 is, for example, an operating device, which is to be controlled in relation to which displays are displayed by it, or which is controlled by inputs from a user, for example. As an application 321, the operating device has, for example, a keyboard and/or a mouse and/or a touch-sensitive or non-touch-sensitive display screen etc., or combinations thereof. In particular, the operating device is a control panel, a personal computer, a laptop, a smartphone, tablet PC, etc. The control of the second additional component 32 and/or its at least one application 321 is performed at least partly on the basis of the control data of the control device 10, which receives the second additional component 32 in the data packets 21, 210.

The third additional component 33 is, for example, a sensing device, which has at least one sensor as application 331 to 33N. The at least one sensor can detect actual values of physical or chemical properties of the workpieces 5, 6 or dimensions or distances of tools from the workpieces 5, 6, etc., according to requirements. Arbitrary types of actual values are conceivable. The control of the third additional component 33 and/or its at least one application 331 to 33N is performed at least partly on the basis of the control data of the control device 10, which the first additional component 33 receives in the data packets 21, 210.

The additional components 31, 32, 33 each transmit data packets 21 or data packets 210 to the control device 10 as a component of the industrial plant 1. The data packets 21, 210 contain, for example, results of the control processes, produced in the additional components 31, 32, 33 based on the control data of the control device 10. Each data packet 21, 210 corresponds to one of at least two channel codings of the transmission medium 20. The at least two channel codings each lead to the same encoded packet length, as shown in FIG. 2 and FIG. 3.

Figure 2:
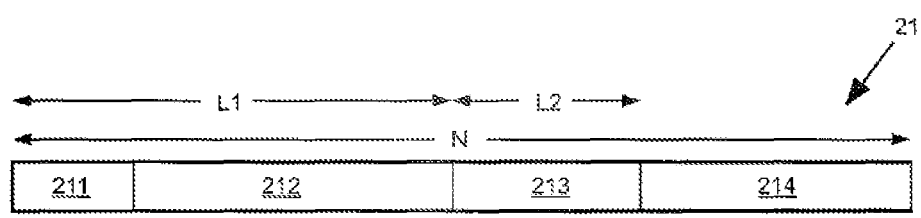
FIG. 2 shows a simplified structure of an encoded data packet with weak channel coding according to the first exemplary embodiment.

FIG. 2 shows the structure of a data packet 21 in more detail. The data packet 21 has four different sections, which are ordered sequentially in time in a predetermined packet length N. The predetermined packet length N corresponds to a number of bits N. The data packet 21 has a first section for signaling data 211, a second section for time-critical data 212, a third section for non-time-critical data 213 and a fourth section for first redundancy data 214. In this case, the first and second section together have a number of bits L1. The non-time-critical data items 213 have a number of bits L2. Therefore, the first redundancy data items 214 have a number of bits N-L1-L2. The signaling data 211 contain pieces of information 211A, 211B as to whether the preceding transmission was successful or not, and pieces of information which specify the current configuration of the error correction, for example the number of check bits, as will be more accurately described and explained in reference to FIG. 4 to FIG. 6.

Figure 3:
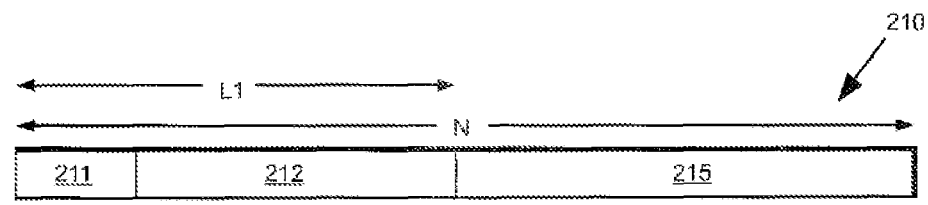
FIG. 3 shows a highly simplified structure of an encoded data packet with strong channel coding according to the first exemplary embodiment.

In accordance with FIG. 3, in the case of a data packet 210 by contrast, only three different sections are present, which are also are arranged sequentially in time in the predetermined packet length N. The predetermined packet length N corresponds to the number of bits N. The data packet 210 also has the first section for signaling data 211 and the second section for time-critical data 212. However, the data packet 210 has a third section for second redundancy data 215. Here again, the first and second section together have the number of bits L1. Therefore, the second redundancy data items 215 have a number of bits N-L1.

The data packet 21 according to FIG. 2 corresponds to a weaker channel coding than the data packet 210 according to FIG. 3. The parameters of the channel coding are chosen in such a way that the number of user bits in the stronger channel coding for the data packet 210 is at least equal to the length of the time-critical data 212. The length of the time-critical data 212 is derived from the number of bits for the time-critical data 212.

In the normal case, during operation of the network communication devices 100, 310, 320, 330 a moderate channel coding with a relatively small number of redundant bits is used. Due to this low level of redundancy, in addition to transmitting the L1 bits for the signaling data 211 and the time-critical data 212, it is also possible to transmit L2 bits for non-time-critical data 213. Therefore, in the normal case a data packet 21 is transmitted.

The moderate channel coding in accordance with the data packet 21 is chosen in such a way that, for the expected bit error probability of the transmission over the transmission medium 20, in most cases all transmission errors can be eliminated. The packet error probability $PER_1$ does not yet necessarily correspond to the desired error probability of system-critical multiple errors.

The stronger channel coding in accordance with the data packet 21 is chosen in such a way that, despite the higher number of redundant bits, the same coded predefined packet length N is used as in the moderate or weaker channel coding. Therefore, the number of user bits is reduced. This can be achieved in one case by the transmission of non-time-critical data 213 being temporarily suspended. Alternatively or additionally, the transmission of time-critical data 212 that can be omitted at the present time can be suspended, in the hope that they will be transmitted correctly again in the next cycle. The parameters of the stronger channel coding are chosen in such a way that the probability of error after the decoding is less than the target probability of the critical multiple errors.

If in the normal case the weak channel coding is used, hence the data packet 21 is used, the probability of single packet errors is $PER_1$. If such a single error is detected by the control device 10 or one of the components 31, 32, 33, the stronger channel coding is applied in the next cycle, i.e. a data packet 210 is used. The conditional probability that a first error occurs and a new error then occurs is $PER_2$. The probability of double errors is thus $PER_1 \cdot PER_2$.

In the following, by reference to FIG. 4 to FIG. 6 the communication is described which takes place in the operation of the industrial plant 1 between the control device 10 as a component of the industrial plant 1 and the other components 31, 32, 33. As a result, a method for controlling a component 10, 31, 32, 33 in the machine or industrial plant 1 is carried out. The method can be integrated into any suitable transmission methods, such as Sercos III, EtherCAT, Profinet, etc.

Figure 4:
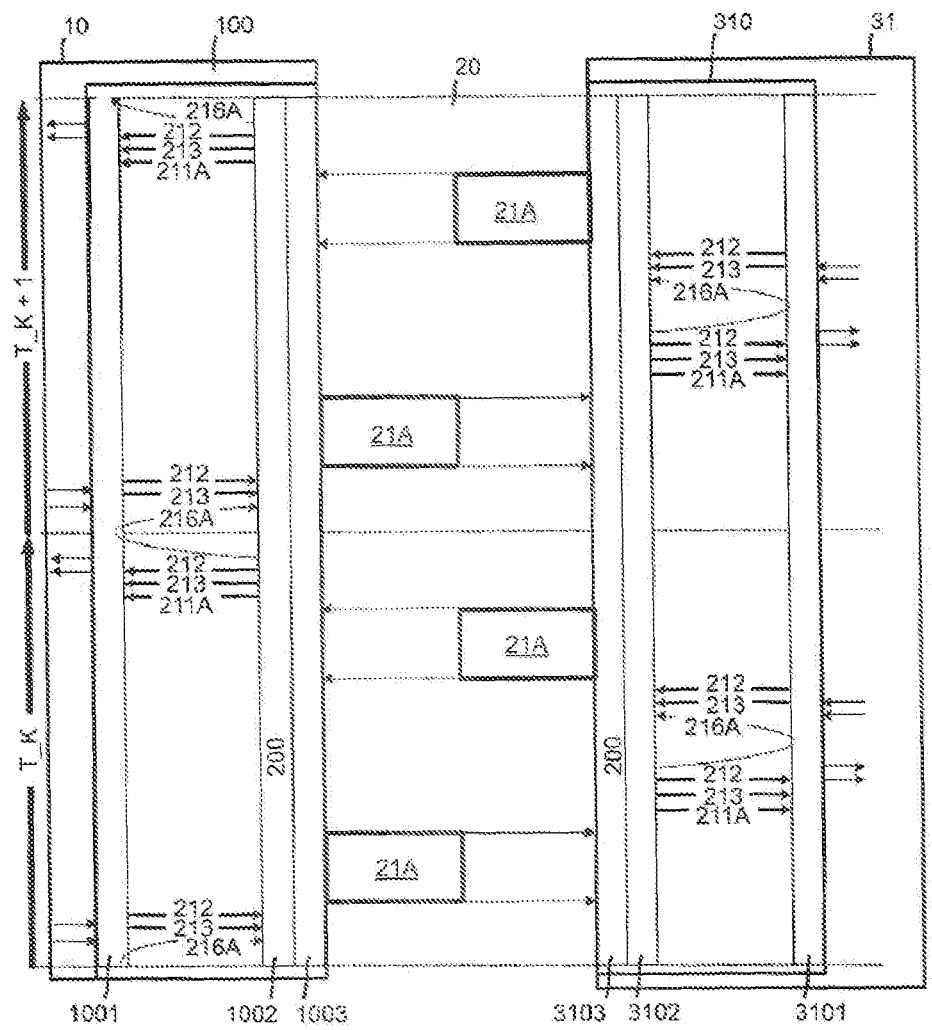
FIG. 4 to FIG. 6 show diagrams each illustrating a method for controlling a component in an industrial plant according to the first exemplary embodiment.
Figure 5:
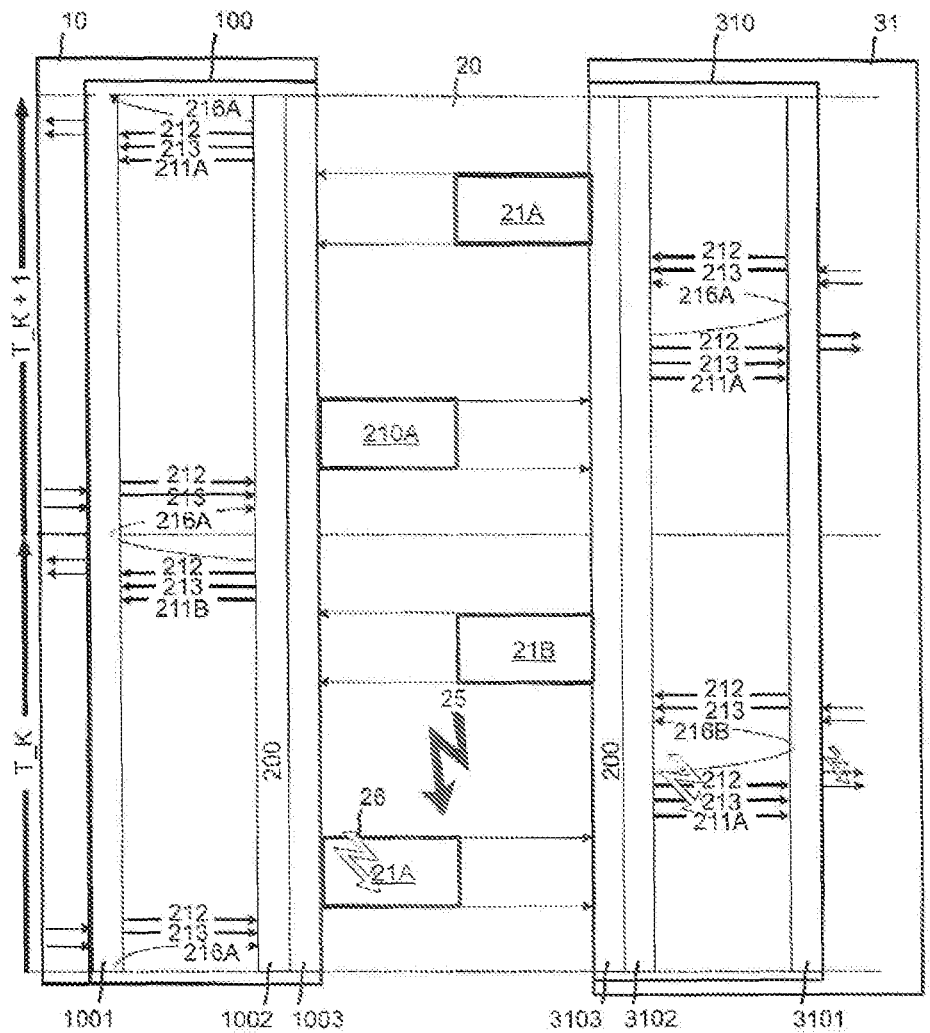
Figure 6:
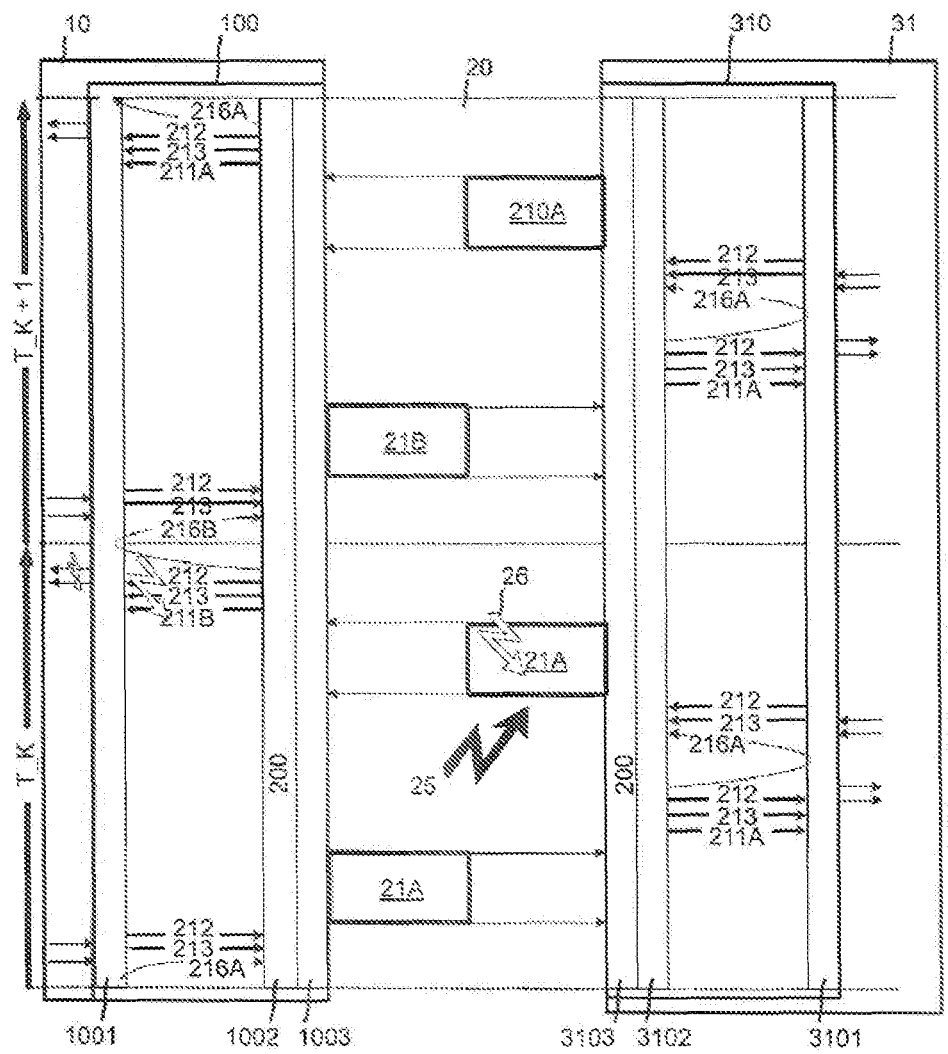

In FIG. 4 to FIG. 6 the time axis runs from bottom to top. A transmission cycle K has a duration T_K. A transmission cycle K+1, which directly follows the transmission cycle K, has a duration T_K+1. The transmission capacity, which is provided as an example of the periodic or cyclic communication between the control device 10 and the other component 31 in the transmission cycles K and K+1, is represented in FIG. 4 by the rectangles for the packets 21A. In FIG. 5 and FIG. 6 packets 21B, 210A are also transmitted, as will be explained below.

In the method, the data to be transmitted, i.e. time-critical and non-time-critical data 212, 213, are transferred by one of the applications 101, 311 to 311N to a MAC Layer 1001, 3101 (MAC=Media Access Control) in the respective network communication device 100, 310. The MAC layer 1001, 3101 controls how the data packets 21A, 21B, 210A are assembled depending on the system status. The system status is oriented, for example, according to which tasks are to be performed in the machine or industrial plant 1.

The respective data packets 21A, 21B, 210A are then transferred to a channel coding/decoding layer 1002, 3102, where depending on the setting, a weak or strong redundancy is added. This results in the different type of channel coding 200 shown for the data packets 21A, 21B, 210A in FIG. 2 and FIG. 3.

As a result, a data packet 21A contains time-critical and non-time-critical data 212, 213 and redundancy data 214 and in the signaling data 211 a signal 211A, that the data of a data packet of the preceding transmission cycle were error-free.

A data packet 21B is structured in the same way as a data packet 21A, except that in the signaling data 211 a signal 211B shows that the data of a data packet of the preceding transmission cycle were not error-free, and therefore a packet error 26 (FIG. 5 and FIG. 6) was present.

A data packet 210A contains time-critical data 212 and redundancy data 214, and in the signaling data 211 a signal 211A that the data of a data packet of the preceding transmission cycle were error-free.

The coded data packets 21A, 21B, 210A are then transmitted in the transmission medium 20, wherein only the reserved transmission resource, in particular a specific time slot, can be used. If the fault 25 occurs in the transmission medium 20, bit errors can occur in the data packets 21A, 21B, 210A during the transmission via the faulty medium 20.

At the network node or the control device 10 or one of the components 31, 32, 33, the respective data packet 21A, 21B, 210A is received and decoded. In most cases any bit errors can be eliminated by the error correction. If this is not possible, transmission errors should at least be reliably detected. Known methods are suitable for this, such as cyclic redundancy check (CRC).

There are also possibilities for combined error correction and error detection, however. The information as to whether the transfer was successful is communicated firstly to the MAC layer 1001, 3101 of the network node or the control device 10 or one of the components 31, 32, 33. The MAC layer 1001, 3101 then forwards the received user data, namely the time-critical and/or non-time-critical data 212, 213, to the application layer 1001, 3101 or discards erroneous data. Secondly, the network node or control device 10 or one of the components 31, 32, 33 transmits the success or failure of the channel decoding by means of the layer 1002, 3102 together with its user data in the reverse direction. The basic procedure in this case, consisting of assignment of the packet structure, channel coding, transmission with the assigned resource and decoding at the receiver, is identical to the forward direction.

The bi-directional communication in the transmission medium 20 can be implemented, as shown in FIG. 4 to FIG. 6, as a half-duplex procedure, in which transmission can only take place in one direction at any given time. Alternatively, the bidirectional communication in the transmission medium 20 can be implemented as a full-duplex procedure, in which it is possible to transmit in both directions at the same time. The rest of the transmission capacity, which is obtained due to the free time frames between the reserved frames, could be used for additional transmission services or other network nodes.

FIG. 4 shows a transmission without packet errors for the transmission cycles K and K+1. Therefore, only the weaker channel coding is used in both transmission directions. As a result, data packets 21A are sent in each case. The successful error correction is communicated to the MAC layer 1002, 3102 as message 216A and to the transmitter by the ACK signal 211A. As long as the control device 10 or the component 31 receives an ACK as the signal 211A, the weak channel coding is used for the following cycle.

By contrast, in the example of FIG. 5 a packet error 26 occurs in the forward direction in the transmission cycle K. If such a packet error 26 cannot be corrected in the cycle K during the channel decoding in the network node such as the component 31, but can be detected, then this will be communicated to the MAC layer 1002, 3102 as message 216B. The MAC layer 3102 then discards the received user data 212, 213. The packet error 26 is communicated to the application layer, which then responds accordingly. In the case of the non-time-critical data 213 a transmission retry may be requested. It is assumed that in spite of the packet error 26 the ACK signal 211A is always received correctly and it is known to the receiver which channel coding 200 was applied in each case.

Due to the fact that an ACK signal 211A is received, time-critical data 212 and non-time-critical data 213 are transmitted in the reverse direction as usual and protected with the weaker channel coding. It is now signaled to the control device 10 with the NACK signal 211B that a packet error 26 has occurred in the forward direction. Therefore, the data packet sent by the component 31 to the control device 10 is now a data packet 21B.

If the control device 10 receives the data packet 21B with the NACK signal 211B, in the following cycle K+1 it briefly interrupts the transmission of non-time-critical data 213, and instead uses the stronger channel coding for the next transmission in the forward direction. For the resulting data packet 210A with the ACK signal 211A, new packet errors 26 in the time-critical data 210A are then highly unlikely.

By contrast, FIG. 6 shows an example in which a packet error 26 occurs in the transmission cycle K in the reverse direction. The procedure here is equivalent to packet errors 26 in the forward direction. The packet error 26 is detected in the control device 10. Therefore, the data error 26 is communicated to the component 31 by the NACK signal 211B with the next data packet 21B in the forward direction in the cycle K+1. The component 31 in the cycle K+1 then interrupts the transmission of non-time-critical data 213 and instead increases the redundancy, so that a data packet 210A is transmitted.

If a transmission error and thus packet error 26 occurs in both the forward and reverse direction directly one after another, then the method works for as long as the NACK signals 211B can be received without errors. As a result, in the next cycle the stronger channel coding is used in both transmission directions and further packet errors 26 are avoided.

For the present method, different channel codings 200 are necessary, which each have the same predefined data packet length N, but different correction properties. For such an adaptive channel coding, one of the following options is conceivable depending on requirements:

a) Convolutional codes with different puncturing, such as used in WLAN (WLAN=Wireless Local Area Network).

b) Use of block codes with equal block length for different levels of error correction performance. It must be noted that both the channel coding and the channel decoding can change significantly. In this alternative design two different decoder algorithms must also be implemented. In the case of a block coding, the volume of information or signaling bits can be divided into blocks. For each block, redundant check bits known as parity bits are added, which can be used to correct a certain number of bit errors. The redundancy of the channel coding here reduces the user data rate for a given total data rate.

c) Iterative coding methods, in which a plurality of codes is nested. An example of this are product codes. Each additional nested code increases the error correction properties, but reduces the data rate at the same time. For the weaker channel coding, the innermost coding and the corresponding decoding could be omitted. By using this approach, the same decoder structure can be partly used for both coding variants.

Thus, the adaptive channel coding 200 in the present method does not relate to an errorful data packet itself, but to the data packet following the errorful data packet. The individual packet error 26 is initially accepted. The likelihood of recurrence of a packet error 26, however, is reduced due to the stronger channel coding using packets 210. The signaling 211B of the first packet error 26 can still take place in the first cycle. The additional delay until the following error-free data packet is received is only extended by the transmission of the additional redundancy and the somewhat more complex error correction. This delay is still tolerable by most real-time systems, however, and is much lower than in a method in which it is attempted to retrospectively correct the packet error 26 that has already occurred, without the need to send the entire data packet 21, 210 again. This is because such a packet is only available at the receiver error-free after a delay, which results from the error signaling, transmission of the additional redundancy and performing the error correction. Such a long delay is often not compatible with time-critical real-time systems.

In a modification of the present method, it is ensured that for each transmission the following two pieces of information are always transferred error-free.

Firstly, it is ensured that the receiver knows unambiguously and without error which channel coding 200 is currently being used. This means that there is no danger that either a part of the strong redundancy is mistakenly kept for non-time-critical data 213, or that non-time-critical data 213 are misinterpreted as part of the stronger redundancy and, as a consequence, time-critical data are wrongly corrected.

Secondly, it is ensured that the receiver can receive the correct signal 211A, 211B error-free in each case. If an ACK signal 211A is misinterpreted as a NACK signal 211B, then the transmission of non-time-critical data 213 will be unnecessarily interrupted in order to apply a stronger channel decoding. This reduces the effective user data rate for the non-time-critical data 213 more than necessary. If, on the other hand, a NACK signal 211A is misunderstood as an ACK signal 211A, then despite a first transmission error, the channel coding is not strengthened. The likelihood of critical multiple errors is thereby greatly increased.

To prevent this, the two pieces of information are optionally secured by a separate strong channel coding, which is independent of the channel coding 200 of the user data 212 and/or 213 and also has an extremely low error probability. Since here only two bits need to be protected, such a permanent, stronger channel coding would be acceptable. The two pieces of information could be included in the signaling data 211.

According to a second exemplary embodiment the control device 10 has the absolute control over the transmission via the transmission medium 20. In this case, a deterministic behavior applies. Such behavior is standard practice for a network with a central controller as the control device 10 and is common practice in many industrial networks.

Here, the central controller as control device 10 has sole control over the time-critical resource allocation and the data formats used. In the case of non-time-critical data 213, in some cases the slaves or the other components 31, 32, 33 can autonomously access the channel of the transmission medium 20. However, a slave cannot assume it will obtain sole access here.

The sole control over the data format of the time-critical data 212 is also present in the present method, even if the component 31 in the example of FIG. 5 instructs the control device 10 as a central controller with the NACK signal 211B to change the packet structure in the next cycle. It is conceivable though, for the control device 10 as a central controller to retain the final control over the packet types used, if this seems to make sense for specific reasons. Thus, the control device 10 as the central controller could ignore NACK-signals 211B in the forward direction and continue to use the weaker channel coding. This makes sense, for example, if no other time-critical data 213 are available for transmission. On the other hand, the control device 10 as the central controller could also use a stronger channel coding 200 in the forward direction, despite an ACK-signal 211A in the reverse direction.

The channel coding 200 in the reverse direction could be controlled by the control device 10 as the central controller by signaling 211A, 211B of ACK and NACK, regardless of whether the preceding decoding was successful or not. However, the components 31, 32, 33 should not deviate from the standard procedure. Thus, they should always apply the channel coding 200 according to the signaling and report detected errors uncorrupted to the control device 10 as the central controller.

A third exemplary embodiment is based on the assumption that a minimum of two or more packet errors 26 are critical for the correct operation of the industrial plant 1. In other words, in the case in which M>3 consecutive errors are system-critical, the procedure taken is as follows. The stronger channel coding is only used if M−1 consecutive packet errors 26 have already occurred. This also results in more lead time for the network devices 10, 31, 32, 33 for changing the channel coding. However, when using the stronger channel coding even the first packet error leads to a system failure.

According to a fourth exemplary embodiment, for the case in which M>3 consecutive packet errors 26 are needed for a system-critical state, the stronger channel coding is used when fewer than M−1 consecutive packet errors 26 have occurred. This only leads to a system failure if more than one packet error 26 occurs with stronger channel coding. This probability is significantly lower.

According to a fifth exemplary embodiment, for the case in which only M>3 consecutive packet errors 26 are system critical, up to M−1 different strengths of channel coding are provided and the channel coding 200 is increased for each additional consecutive packet error 26.

Depending on the choice of the methods according to the first to fifth exemplary embodiment, a good compromise can always be found between a usable data rate and the avoidance of critical multiple errors.

All previously described embodiments of the system and the method executed thereby can be used individually or in all possible combinations. In particular, all features and/or functions of the previously described exemplary embodiments can be combined as required. In addition, in particular the following modifications are conceivable.

The parts shown in the figures are illustrated schematically and may differ in their exact embodiment from the forms shown in the figures, as long as their features described above are guaranteed.

The industrial plant 1 can be a programmable logic controller (PLC). The industrial plant 1 can be a CNC controller (Computerized Numerical Control). The industrial plant 1 can be or have a movement logic controller, for example for transport systems or for guiding tools, etc.

As an alternative to the previously described method, in which the gross packet length is constant and the net amount of data is briefly reduced, e.g. by suspension of non-time-critical data, it is possible that the amount of user data remains constant and the gross packet length is briefly increased.

The previously described method may be used in any desired configurations or systems, in which data must be transmitted in a time-critical way, but isolated packet errors are not critical. The approach described is particularly interesting for real-time communication in industrial automation. But any other real-time data stream is conceivable, in which individual packet errors can still be corrected by interpolation, but multiple errors are to be prevented. Other examples can be control tasks in vehicles (steer-by-wire, brake-by-wire), where it is more important in the event of an error that current commands are transmitted successfully, than that previous commands are repeated.

What is claimed is:

1. A component for one of (i) a machine and (ii) an industrial plant, the component comprising:
a network communication device configured to control a transmission of data in a data network of the one of (i) the machine and (ii) the industrial plant, the network communication device being configured to cyclically transmit and receive a plurality of data packets having a predetermined packet length between the component and at least one other component of the one of (i) the machine and (ii) the industrial plant, without a repeat transmission of time-critical data of the plurality of data packets being possible in a transmission cycle,
wherein the network communication device is configured to tolerate a possible packet error in a first data packet of the plurality of data packets that was received in a preceding transmission cycle, and to signal to the at least one other component in a following transmission cycle one of (i) a presence and (ii) an absence of a packet error in the first data packet,
wherein the network communication device is configured to determine whether the at least one other component has signaled a presence of a packet error in a second data packet of the plurality of data packets sent by the component in the preceding transmission cycle,
wherein the network communication device is configured to, depending on whether the at least one other component has signaled the presence of a packet error in the second data packet, increase a number of redundancy data items in a third data packet of the plurality of data packets to be sent in the following transmission cycle to increase a correction probability of bit errors in time-critical data to be sent, wherein the network communication device is configured to, if no packet error is determined in the preceding transmission cycle, one of (i) increase a number of time-critical data items in the third data packet to be sent in the following transmission cycle and (ii) include non-time-critical data, which are to be transferred but for which a time delay is uncritical, in the third data packet to be sent in the following transmission cycle, and wherein the network communication device is configured to, if a packet error is determined in the preceding transmission cycle, include the redundancy data items in the third data packet to be sent in the following transmission cycle instead of one of (i) the non-time-critical data and (ii) a portion of the time-critical data.

2. The component according to claim 1, wherein the network communication device is configured to include in a fourth data packet of the plurality of data packets to be sent in a current transmission cycle (i) a first piece of information indicating whether the first data packet, which was sent from the at least one other component to the component in the preceding transmission cycle, had a packet error, and (ii) a second piece of information indicating the current configuration of the fourth data packet, which is used by the at least one additional component for error correction of the time-critical data.

3. The component according to claim 2, wherein at least one of:
the first piece of information consists of one bit and the second piece of information specifies a number of check bits in the fourth data packet; and
the redundancy data items are check bits.

4. The component according to claim 2, wherein the network communication device is configured to (i) examine the time-critical data for bit errors and, (ii) if at least one bit error is present, perform an error correction of the time-critical data based on the second piece of information and the redundancy data.

5. The component according to claim 1, further comprising:
an application configured to use the time-critical data,
wherein the network communication device is configured to transfer the time-critical data to the application in response to the network communication device not detecting a packet error, and
wherein the network communication device is configured to inform the application that transmission errors have occurred and that no valid data are available in a current transmission cycle in response to the network communication device detecting a packet error.

6. The component according to claim 1, wherein the component is a control device, and wherein one of:
the at least one other component is at least one tool of the industrial plant and the control device is configured to control the at least one tool;
the at least one other component is at least one of a sensor and an actuator of the machine and the control device is configured to control the least one of the sensor and the actuator; and
the at least one other component is one of a power-assisted steering system and a servo-assisted braking system of a vehicle and the control device is configured to control the one of the power-assisted steering system and the servo-assisted braking system.

7. A data network for one of (i) a machine and (ii) an industrial plant, having
a transmission medium, the transmission medium being one of cable-bound and wireless, and
at least two components connected to each other via the transmission medium, each of the at least two components comprising:
a network communication device configured to control a transmission of data in the data network of the one of (i) the machine and (ii) the industrial plant, the network communication device being configured to cyclically transmit and receive a plurality of data packets having a predetermined packet length between the respective component of the least two components and at least one other of the least two components, without a repeat transmission of time-critical data of the plurality of data packets being possible in a transmission cycle,
wherein the network communication device is configured to tolerate a possible packet error in a first data packet of the plurality of data packets that was received in a preceding transmission cycle, and to signal to the at least one other component in a following transmission cycle one of (i) a presence and (ii) an absence of a packet error in the first data packet,
wherein the network communication device is configured to determine whether the at least one other of the least two components has signaled a presence of a packet error in a second data packet of the plurality of data packets sent by the component in the preceding transmission cycle,
wherein the network communication device is configured to, depending on whether the at least one other of the least two components has signaled the presence of a packet error in the second data packet, increase a number of redundancy data items in a third data packet of the plurality of data packets to be sent in the following transmission cycle to increase a correction probability of bit errors in time-critical data to be sent, and
wherein the network communication device is configured to include in a fourth data packet of the plurality of data packets to be sent in a current transmission cycle (i) a first piece of information indicating whether the first data packet, which was sent from the at least one other component to the component in the preceding transmission cycle, had a packet error, and (ii) a second piece of information indicating the current configuration of the fourth data packet, which is used by the at least one additional component for error correction of the time-critical data.

8. The data network according to claim 7, wherein:
one of the at least two components is a control device;
at least one other of the at least two components is at least one of (i) at least one tool of the industrial plant, and (ii) at least one of a sensor and an actuator of the machine and the control device is configured to control the at least one other of the least two components;
the control device is configured as a central controller to bi-directionally exchange data packets with each additional component of the least two components; and
each additional component of the least two components is configured to only exchange data packets with the central controller.

9. A method for controlling a component for one of (i) a machine and (ii) an industrial plant, the component having a network communication device configured to control a transmission of data in a data network of the one of (i) the machine and (ii) the industrial plant, the network communication device being configured to cyclically transmit and receive a plurality of data packets having a predetermined packet length between the component and at least one other component of the one of (i) the machine and (ii) the industrial plant, without a repeat transmission of time-critical data of the plurality of data packets being possible in a transmission cycle, the method comprising:
  tolerating, with the network communication device, a possible packet error in a first data packet of the plurality of data packets that was received in a preceding transmission cycle,
  determining, with the network communication device, whether the at least one other component has signaled a presence of a packet error in a second data packet of the plurality of data packets sent by the component in the preceding transmission cycle,
  adjusting, with the network communication device, depending on whether the at least one other component has signaled the presence of a packet error in the second data packet, a number of redundancy data items in a third data packet of the plurality of data packets to be sent in the following transmission cycle to increase a correction probability of bit errors in time-critical data to be sent, and
  including signaling data in the third data packet that signals to the at least one other component one of (i) a presence and (ii) an absence of a packet error in the first data packet.

* * * * *